United States Patent
Espeseth et al.

(10) Patent No.: US 6,877,070 B2
(45) Date of Patent: Apr. 5, 2005

(54) METHOD AND APPARATUS FOR IMPLEMENTING COMMAND QUEUE ORDERING WITH BENEFIT DETERMINATION OF PREFETCH OPERATIONS

(75) Inventors: Adam Michael Espeseth, Rochester, MN (US); David Robison Hall, Rochester, MN (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 288 days.

(21) Appl. No.: 10/201,497

(22) Filed: Jul. 23, 2002

(65) Prior Publication Data

US 2004/0019745 A1 Jan. 29, 2004

(51) Int. Cl.[7] ............................................. G06F 12/00
(52) U.S. Cl. ........................... 711/137; 711/4; 711/111; 711/112; 711/113; 711/115; 711/118; 711/213
(58) Field of Search ........................... 711/4, 111–113, 711/137, 115, 118, 213, 100, 158; 710/5.6

(56) References Cited

U.S. PATENT DOCUMENTS

| | | | | |
|---|---|---|---|---|
| 5,570,332 A | * | 10/1996 | Heath et al. ................ | 369/30.1 |
| 5,991,825 A | * | 11/1999 | Ng ................................. | 710/6 |
| 6,170,042 B1 | * | 1/2001 | Gaertner et al. ............ | 711/158 |
| 6,574,676 B1 | * | 6/2003 | Megiddo ........................ | 710/5 |
| 6,711,628 B1 | * | 3/2004 | Thelin ............................ | 710/6 |
| 6,721,906 B1 | * | 4/2004 | Hirashita et al. ............. | 714/54 |

* cited by examiner

Primary Examiner—Matthew Anderson
Assistant Examiner—Zhuo H. Li
(74) Attorney, Agent, or Firm—Joan Pennington

(57) ABSTRACT

A method and apparatus are provided for implementing command queue ordering with benefit determination of a prefetch operation. For each command in a hard disk drive command queue, a rotational position optimization (RPO) score is calculated. A prefetch benefit is calculated for each command in the hard disk drive command queue within a working partition. The RPO score is modified utilizing the calculated prefetch benefit for the commands in the hard disk drive command queue within the working partition. A best RPO score is identified to select a next command in the hard disk drive command queue to execute.

12 Claims, 5 Drawing Sheets

126

ARRIVAL BANDS (SIDs) 132

| SEEK DISTANCE (CYLINDER GROUPS) 134 | 0-2 | 0-2 | 3-5 | 3-5 | 6-8 | 6-8 | 9 | 9 |
|---|---|---|---|---|---|---|---|---|
| | MAKE | MISS | MAKE | MISS | MAKE | MISS | MAKE | MISS |
| 0-30 | 4 | 2 | 9 | 0 | 4 | 0 | 72 | 6 |
| 31-91 | 4 | 1 | 6 | 0 | 2 | 0 | 98 | 5 |
| 92-182 | 9 | 7 | 5 | 0 | 4 | 0 | 150 | 4 |
| 183-303 | 27 | 5 | 13 | 1 | 15 | 1 | 208 | 4 |
| 304-454 | 36 | 5 | 16 | 1 | 14 | 4 | 236 | 11 |
| 455-635 | 21 | 10 | 8 | 7 | 15 | 6 | 224 | 14 |
| 636-846 | 23 | 11 | 18 | 2 | 14 | 2 | 153 | 8 |
| 847-1087 | 42 | 13 | 14 | 3 | 10 | 2 | 173 | 6 |
| 1088-1358 | 42 | 13 | 18 | 3 | 17 | 2 | 221 | 8 |
| 1359-1559 | 62 | 19 | 26 | 3 | 30 | 3 | 238 | 7 |
| 1560-1990 | 67 | 25 | 22 | 1 | 22 | 2 | 163 | 3 |

FIG. 1B

METHOD AND APPARATUS FOR IMPLEMENTING COMMAND QUEUE ORDERING WITH BENEFIT DETERMINATION OF PREFETCH OPERATIONS

FIELD OF THE INVENTION

The present invention relates generally to command queue ordering in a direct access storage device (DASD), and more particularly, relates to a method and apparatus for implementing command queue ordering with benefit determination of prefetch operation.

DESCRIPTION OF THE RELATED ART

In hard disk drives, when more there are than one command to execute, the data to be accessed next is chosen from a list or a queue of outstanding commands. When a hard disk drive has more than one command to execute, the commands are placed in a queue from which the next command is chosen. A Rotational Position Optimization (RPO) algorithm is used to reorder the commands for execution. Presently, hard disk drives use the Shortest Access Time First (SATF) RPO algorithm to determine which command to select.

The conventional SATF algorithm works as follows: Given a set of commands in a queue, a command is chosen that can be started or accessed first. This calculation has two parts, the time to perform the seek and settle operation from the current cylinder to the target cylinder and the latency between this point and when the starting sector for the command is reached. Together those parts make up the estimated access time for each queued command. The SATF algorithm depends on accurate estimates of the access time. If the estimate is too low, the actuator may settle on track after the desired sector has already passed rotationally. This is called a miss. A miss adds one full revolution to the access time, degrading performance. If the access time estimate is too high, the optimal command candidate is not chosen for execution.

One problem with the typical SATF algorithm is that the benefit of caching data associated with each command in the queue is not taken into account when selecting the next command for execution. When a read command is selected by an RPO algorithm and executed, a certain amount of data is prefetched into the cache during the disk read operation. In addition to the data requested by the read command itself, adjacent blocks may be prefetched into the same cache segment. These adjacent blocks can be prefetched with no performance penalty, in the case of zero latency read, or with a possible penalty in the case of prefetching blocks that extend the effective length of a current command being executed. The latter is called a back-end zero latency read. In either case, the benefit of the prefetch operation is an increased cache hit rate for subsequent reads to the prefetched range of blocks.

SUMMARY OF THE INVENTION

A principal object of the present invention is to provide a method and apparatus for implementing command queue ordering with benefit determination of a prefetch operation. Other important objects of the present invention are to provide such method and apparatus for implementing command queue ordering with benefit determination of a prefetch operation substantially without negative effect and that overcome many of the disadvantages of prior art arrangements.

In brief, a method and apparatus are provided for implementing command queue ordering with benefit determination of a prefetch operation. For each command in a hard disk drive command queue, a rotational position optimization (RPO) score is calculated. A prefetch benefit is calculated for each command in the hard disk drive command queue within a working partition. The RPO score is modified utilizing the calculated prefetch benefit for the commands in the hard disk drive command queue within the working partition. A best RPO score is identified to select a next command in the hard disk drive command queue to execute.

BRIEF DESCRIPTION OF THE DRAWINGS

The present invention together with the above and other objects and advantages may best be understood from the following detailed description of the preferred embodiments of the invention illustrated in the drawings, wherein:

FIG. 1B is a diagram illustrating an example seek classification table for implementing hard disk drive command queue ordering with benefit determination of prefetch operation in accordance with the preferred embodiment;

DETAILED DESCRIPTION OF THE PREFERRED EMBODIMENTS

Figure 1A:
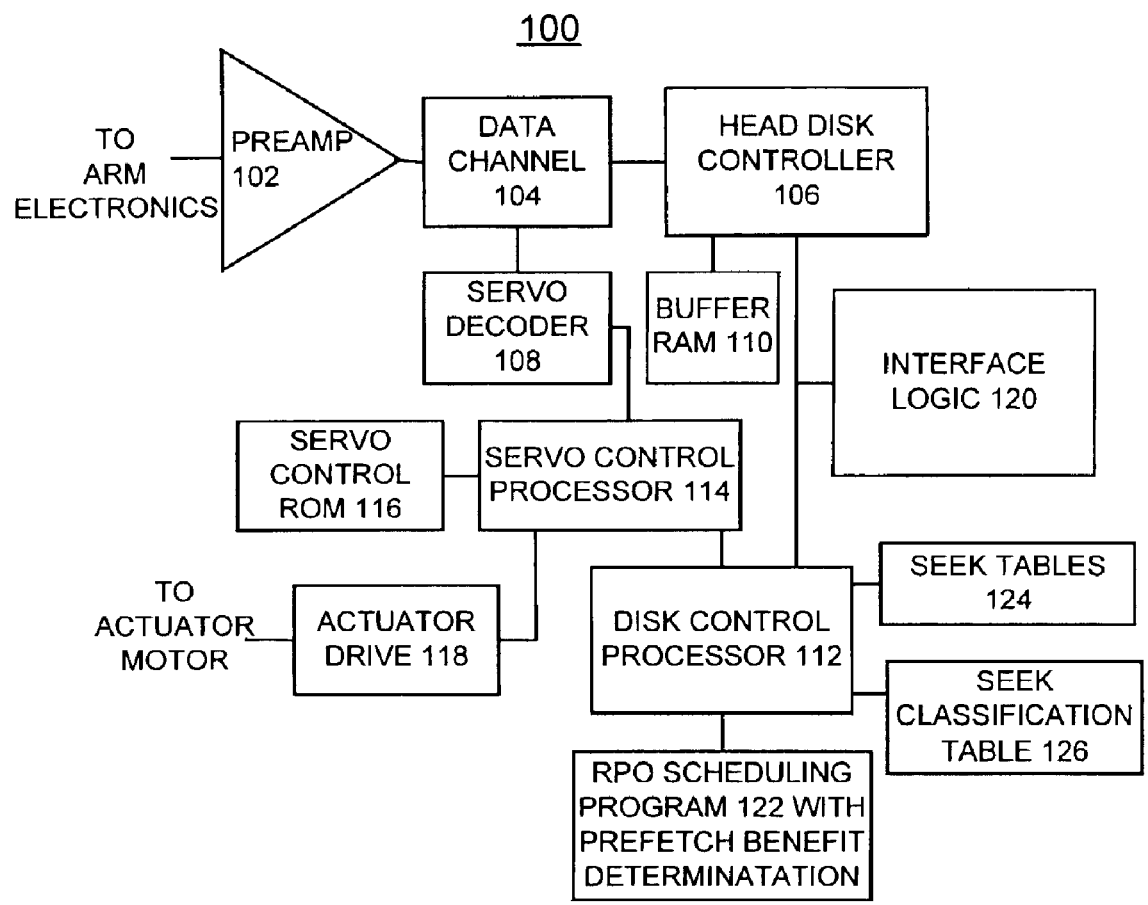
FIG. 1A is a block diagram representation illustrating a disk file system for implementing hard disk drive command queue ordering methods including benefit determination of prefetch operation in accordance with the preferred embodiment.

Having reference now to the drawings, in FIG. 1, there is shown a disk file system for carrying out the scheduling method including prefetch operation benefit determination of the preferred embodiment generally designated by the reference character 100. Servo information and customer data are amplified by a preamplifier (preamp) 102. A data channel 104 uses sampling techniques for detecting the readback signals from the disk surfaces that contain the customer data. A head disk controller 106 is coupled to the data channel 104. A servo decoder 108 coupled to the data channel 104 provides a servo timing signal to the head disk controller 106. A buffer random access memory 110 is coupled to the head disk controller 106. A disk control processor 112 is coupled to the head disk controller 106 and to a servo control processor 114. A servo control read only memory (ROM) 116 and an actuator drive 118 are coupled to the servo control processor 114. The servo control processor 114 performs servo control functions providing servo positioning control signals to the actuator driver 118 that is coupled to an actuator motor assembly (not shown). An interface logic 120 coupled to the head disk controller 106 and the disk control processor 112 performs interface logic functions. Scheduling data accesses is provided with a Rotational Position Optimization (RPO) scheduling program 122 with prefetch benefit determination of the preferred embodiment coupled to the disk control processor 112. Seek tables 124 and a seek classification table 126 of the preferred embodiment utilized by the RPO scheduling program 122 are coupled to the disk control processor 112. Disk control processor unit 112 is suitably programmed to execute the flow charts of FIGS. 2 and 3 of the preferred embodiment.

Referring now to FIG. 1B, there is shown an example seek classification table 126 for implementing DASD command queue ordering in accordance with the preferred embodiment. When the drive's past performance history is stored and retrieved, it is classified according to the major factors that typify it. As shown in FIG. 1B, seek classification table 126 allows for memory space efficiency while maintaining expected access time accuracy. The main two dimensions used in classifying seeks are arrival bands 132 and seek distance or cylinder groups 134. Arrival bands 132 are groups of seeks that contain the same difference between the estimated seek time and the amount of time required to perform the seek. The arrival band 132 represents the difference in latency estimated to exist after the seek is complete. Cylinder groups 134 are groups of seeks that share the same seeking distance measured in cylinders. The arrival bands 132 are grouped linearly, while the cylinder groups 134 are grouped such that the same amount of rotational time is represented in each cylinder group. In other words, the groups are created in such a way that each cylinder group 134 corresponds to the same amount of seek table entries. For each entry in the arrival band 132 versus cylinder group 134 in the seek classification table 126, miss and make count values are stored.

The number and size of the cylinder groups 134 and the arrival bands 132 can be varied depending on the amount of memory allotted for storing seek data. The command cost calculation becomes more accurate as the number of groups 134, 132 increases and the size of each group 134, 132 decreases. It should be understood that additional dimensions can be added to the seek classification table 126 when memory is available. For example, the additional dimensions may include head and seek direction.

Figure 2:
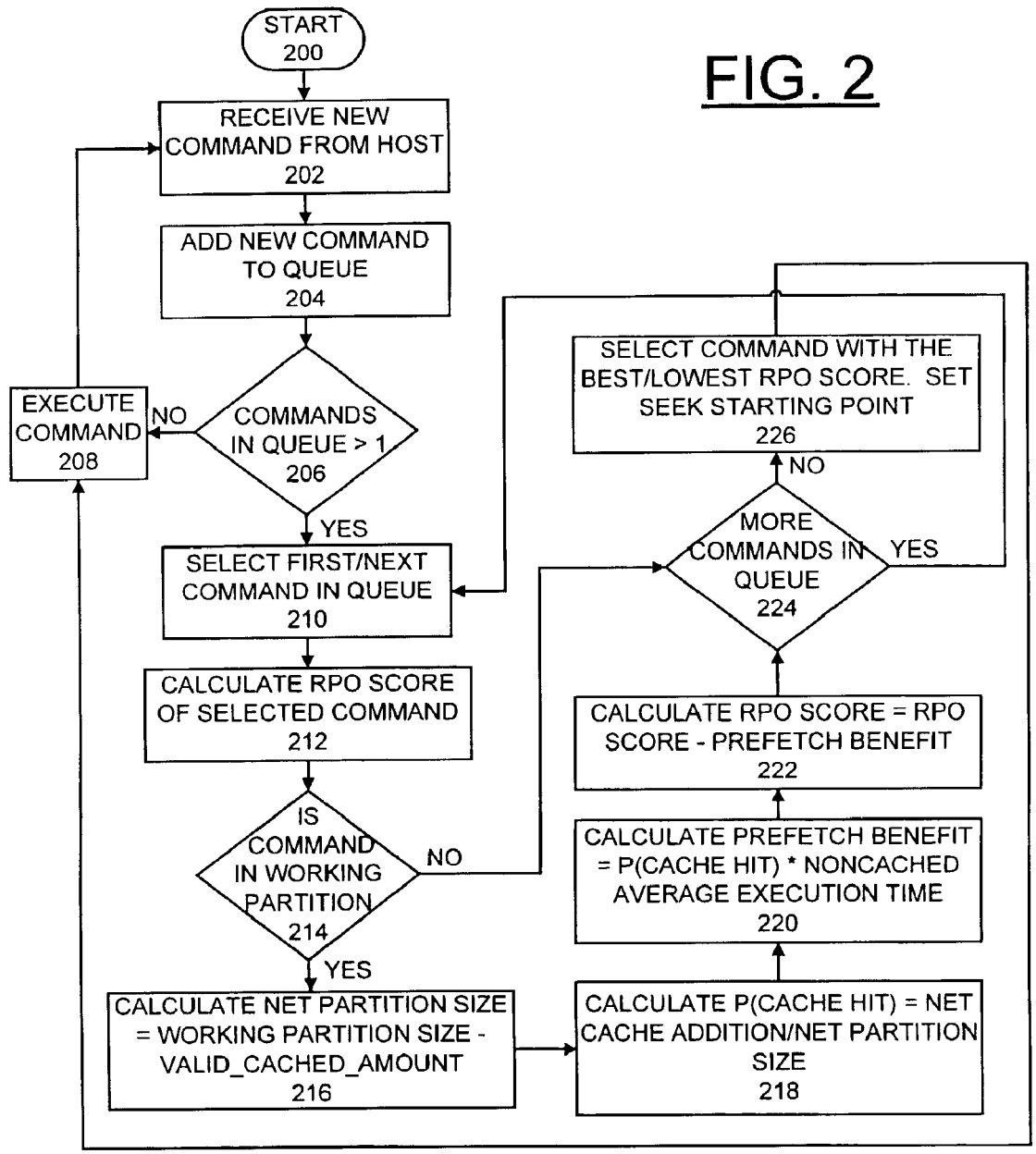
FIGS. 2 and 3 are flow charts illustrating exemplary sequential steps for implementing hard disk drive command queue ordering with benefit determination of prefetch operation in accordance with the preferred embodiment.

In accordance with features of the invention, the RPO scheduling program 122 includes a method calculating the expected benefit of any prefetch operation, as illustrated and described with respect to FIG. 2. This expected benefit determination can be used with various different RPO algorithms to help determine the optimal command to select for execution. The prefetch operation expected benefit can be measured in servo IDs (SIDs), which can be subtracted from the expected execution time of a command and favor it for selection. The invention advantageously also is used to make the decision to perform a prefetch that would extend the effective length of a command. The invention provides a mechanism for comparing the benefit of starting the seek for the next command or continuing to prefetch data for the currently executing command, as illustrated and described with respect to FIG. 3.

In accordance with features of the invention, an RPO problem that involves random, short block, queued reads in a small partition is addressed. In one test, the LBA testing range is limited to 1 MB and 4 k random reads are issued at a queue depth of 16. This workload reveals if the RPO algorithm takes prefetching opportunities into account when making selections. A conventional RPO algorithm will attempt to maximize the number of random commands that can be executed in one revolution. This invention allows any RPO algorithm to take the benefits of caching into account, and make smarter decisions. As an example, for the workload described above, consider the decision to execute Command A which has 30 SIDs of latency, or Command B which has 50 SIDs of latency. In a typical conventional RPO implementation, Command A will be selected because it can be accessed first. Using the present invention, Command B is likely to be selected because it will allow the drive to fill a segment with useful data during the zero latency read operation. Selecting Command B will increase the cache hit rate, and improve the drive's overall throughput. The present invention enables detecting when prefetches are desirable and modifying the command selections accordingly.

The present invention provides a system and method for accurately calculating the expected benefit of prefetching data into the cache. The expected benefit is calculated by estimating the probability of a subsequent cache hit on the newly prefetched data and multiplying this with the average command time of a non-cached read command. A key part of the invention involves how the probability of a subsequent cache hit is determined.

Referring now to FIG. 2, there are shown exemplary sequential steps for implementing hard disk drive command queue ordering in accordance with the preferred embodiment. The invention is now described and illustrated using a simple implementation that demonstrates its utility. The invention is used to assist an RPO algorithm in choosing the optimal command for execution.

The illustrated implementation of FIG. 2 involves a common prefeteching technique termed zero latency read, the prefetch operation incurs zero penalty. Zero latency read is used to describe the prefetch of data that exists between the seek complete point and the first sector of the targeted read data on the target head. In this implementation of the invention, the benefit of the normal zero latency read operation is taken into account by RPO when selecting the next command for execution. While this implementation is described in detail, it should be noted that the invention simply involves efficiently calculating the benefit of a prefetch operation and the invention has many other conceivable applications.

A zero latency read operation begins prefetching data on the target track as soon as the seek is complete. Therefore, data that passes under the head before reaching the first target sector is cached. The amount of extra data cached as part of this operation depends on the amount of extra time that exists between the seek complete point and the starting sector of the read operation. This amount of extra time is known by the RPO algorithm, and can be used to estimate how much extra data can be prefetched by the zero latency read operation for each command in the queue.

In FIG. 2 sequential steps start at a block 200. A new command from the host is received as indicated in a block 202. The new command from the host is added to the queue as indicated in a block 204. Checking whether more than two commands are in the queue is performed as indicated in a decision block 206. If not, then a command is executed as indicated in a block 208.

When more than two commands are in the queue, then a first/next command in the queue is selected as indicated in a block 210. Next an RPO score of the selected command is determined as indicated in a block 212. Various different RPO algorithms can be used to calculate the RPO score of the selected command at block 212. Next checking whether the selected command is within a working partition is performed as indicated in a decision block 214. If so, then the prefetch benefit is calculated as indicated in blocks 216, 218 and 220. Next the RPO score is calculated as indicated in a block 222 that is equal to the calculated RPO score at block 212 minus the prefetch benefit.

When using the invention to assist RPO to optimize for zero latency read operations, an example RPO cost function is shown as equation (1):

$$rpo\_score = delay + P(miss) * (1 - rev) - prefetch\_benefit \quad (1)$$

Delay is defined as estimated seek time plus extra latency, and P(miss) is the probability of a miss. The estimated seek time variable used is the above equations is looked up in one seek table 124 stored in memory. Each seek table 124 stores rotational time versus seek distance data. Two seek tables 124 are stored, one for read commands and one for write commands. When a seek distance is looked up in the table 124, a rotational time measured in servo IDs (SIDs) required to successfully perform the seek is returned. If the minimum rotational time is greater than the available rotational time, the time of one full revolution is added to the estimated seek time used in the calculation above. This type of seek table is currently used in expected access time algorithms. The probability of a miss variable P(miss) used in the above calculations is determined using miss data as the drive 100 operates stored in the seek classification table 126 of the preferred embodiment.

The prefetch_benefit variable provided at block 220 is measured in SIDs. Then it is determined whether there are more commands in the queue as indicated in a decision block 224. When there are more commands in the queue, then the sequential operations return to block 210 to select a next command and continue. When determined that the selected command is not within a working partition at decision block 214, the checking for more commands in the queue is performed at decision block 224. When there are no more commands in the queue, then the command with the lowest rpo_score is selected for execution and the seek starting point is set as indicated in a block 226. Then the selected command is executed at block 208. Then a new command from the host is received at block 202.

At block 220 the benefit of a prefetch operation is calculated using the following formula, shown as equation (2):

$$\text{Prefetch\_benefit} = P(\text{cache\_hit}) * \text{noncached\_avg\_execution\_time} \quad (2)$$

When P(cache_hit) is the cache hit probability or the probability of subsequent cache hit resulting from the prefetch and noncached_avg_execution_time is the average time required to execute a non-cached command. The noncached_avg_execution_time variable varies depending on the current workload and is calculated and updated as the drive operates. A key component of the invention involves how P(cache_hit) is determined. At block 218, the probability of a cache hit is calculated as shown in equation (3) below.

$$P(\text{cache\_hit}) = (\text{net\_cache\_addition}) / (\text{net\_partition\_size}) \quad (3)$$

In equation (3), the net_cache_addition is the net amount of valid data that will be added to the cache as part of the read and prefetch operations. It is implied that the amount of cached data considered valid in this sense is the amount of valid cached data that is contained in the working partition, as described below. The net_cache_addition is calculated by determining the amount of additional useful data from the working partition that will be added to the cache during the prefetch and read.

At block 216, the net_partition_size variable in equation (3) is calculated by determining the working_partition_size and subtracting from the working_partition_size the amount of valid data from the working partition that currently exists in the cache. This is illustrated in equation (4) below.

$$\text{Net\_partition\_size} = \text{working\_partition\_size} - \text{valid\_cached\_amount} \quad (4)$$

The working_partition_size is determined by keeping track of the average target cylinder for access commands. In conjunction with this running average, the standard deviation can also be tracked. Using the average target cylinder and the standard deviation (sigma) of this distribution, the working partition boundaries and size can be determined using the 95% confidence interval. The 95% confidence interval is determined by adding and subtracting 2-sigma from the average cylinder. This interval is defined as the working_partition.

Figure 3:
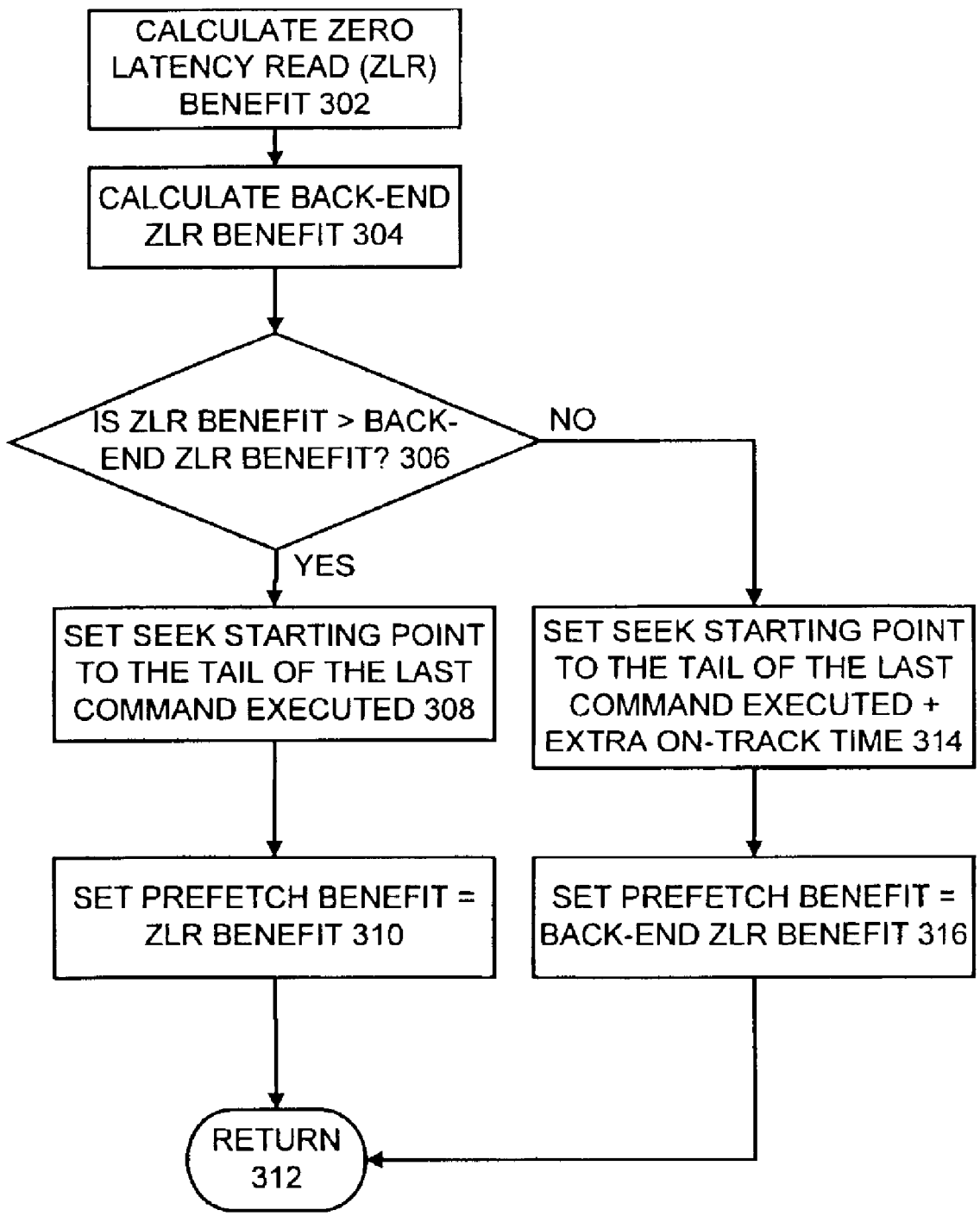

Referring now to FIG. 3, there are shown alternative exemplary sequential steps for calculating prefetch benefit for implementing hard disk drive command queue ordering in accordance with the preferred embodiment. As shown in FIG. 3, the invention enables comparing the benefit of starting the seek for the next command or continuing to prefetch data for the currently executing command.

In FIG. 3, both zero latency read (ZLR) benefit and back-end ZLR benefit are calculated as indicated in a blocks 302 and 304. At block 304, the additional step of calculating the back-end ZLR benefit is used to make the decision to perform a prefetch that would extend the effective length of a command. As indicated in a decision block 306, the calculated ZLR benefit is compared with the calculated back-end ZLR benefit. When the calculated ZLR benefit is greater than the calculated back-end ZLR benefit, then the seek starting point is set to the tail of the last command executed as indicated in a block 308. Then the prefetch benefit is set equal to the calculated ZLR benefit as indicated in a block 310. Then as indicated in a block 312, the sequential steps return, for example, to block 222 in FIG. 2 to calculate the RPO score using the identified prefetch benefit. Otherwise when the calculated ZLR benefit is not greater than the calculated back-end ZLR benefit, then the seek starting point is set to the tail of the last command executed plus the extra on-track time as indicated in a block 314. Then the prefetch benefit is set equal to the calculated back-end ZLR benefit as indicated in a block 316. Then the sequential steps return at block 312.

Figure 4:
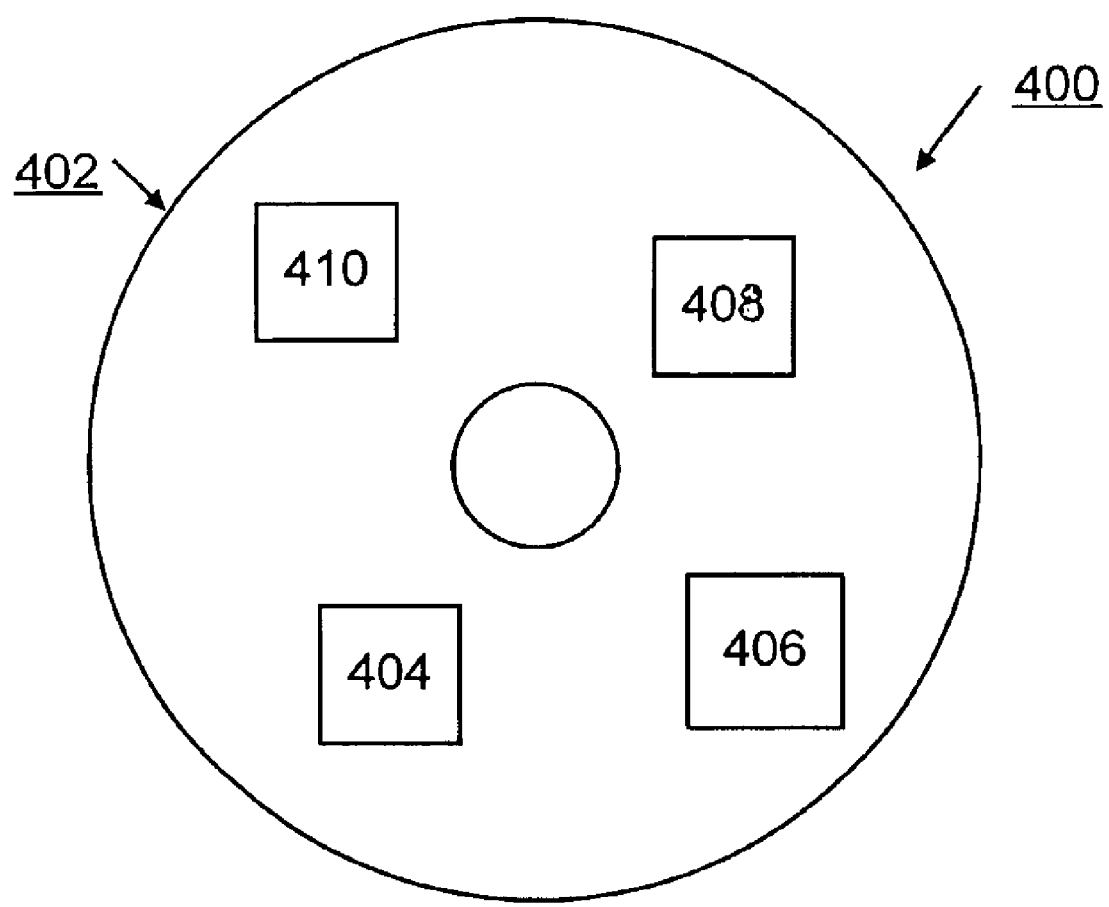
FIG. 4 is a block diagram illustrating a computer program product in accordance with the preferred embodiment.

Referring now to FIG. 4, an article of manufacture or a computer program product 400 of the invention is illustrated. The computer program product 400 includes a recording medium 402, such as, a floppy disk, a high capacity read only memory in the form of an optically read compact disk or CD-ROM, a tape, a transmission type media such as a digital or analog communications link, or a similar computer program product. Recording medium 402 stores program means 404, 406, 408, 410 on the medium 402 for carrying out the methods for implementing hard disk drive command queue ordering of the preferred embodiment in the disk file system 100 of FIG. 1.

A sequence of program instructions or a logical assembly of one or more interrelated modules defined by the recorded program means 404, 406, 408, 410, direct the disk file system 100 for implementing hard disk drive command queue ordering of the preferred embodiment.

While the present invention has been described with reference to the details of the embodiments of the invention shown in the drawing, these details are not intended to limit the scope of the invention as claimed in the appended claims.

What is claimed is:

1. A method for implementing command queue ordering with prefetch benefit determination comprising the steps of:

for each command in a hard disk drive command queue, calculating a rotational position optimization (RPO) score;

calculating a prefetch benefit of each said command in said hard disk drive command queue within a working partition including the steps of multiplying a cache hit probability resulting from a prefetch by an average time required to execute a non-cached command to calculate said prefetch benefit, calculating said cache hit probability resulting from said prefetch;

wherein the step of calculating said cache hit probability resulting from said prefetch is represented by:

$$P(\text{cache hit}) = (\text{net cache addition})/(\text{net partition size})$$

where said net cache addition equals a net amount of valid data to be added to a cache as part of read and prefetch operations and said net partition size is a calculated variable;

modifying said RPO score of said identified commands in said hard disk drive command queue within said working partition utilizing said calculated prefetch benefit; and identifying a best RPO score for selecting a next command in said hard disk drive command queue to execute.

2. A method for implementing command queue ordering with prefetch benefit determination as recited in claim 1 wherein said net partition size is calculated by determining a working partition size and subtracting from said working partition size an amount of valid data currently existing in said cache.

3. A method for implementing command queue ordering with prefetch benefit determination as recited in claim 2 wherein said working partition size is determined by using an average target cylinder for said commands in said hard disk drive command queue.

4. A method for implementing command queue ordering with prefetch benefit determination as recited in claim 2 wherein said working partition size is determined by using said average target cylinder together with a standard deviation of said average target cylinder over time.

5. A method for implementing command queue ordering with prefetch benefit determination as recited in claim 1 wherein the steps of calculating said prefetch benefit of each said command in said hard disk drive command queue within said working partition includes the steps of calculating a cache hit probability resulting from a read prefetch for each said command in said hard disk drive command queue within said working partition.

6. A method for implementing command queue ordering with prefetch benefit determination as recited in claim 1 wherein the steps of calculating said prefetch benefit of each said command in said hard disk drive command queue within said working partition includes the steps of calculating a zero latency read (ZLR) benefit of each said command in said hard disk drive command queue within said working partition.

7. A method for implementing command queue ordering with prefetch benefit determination as recited in claim 6 includes the steps of calculating a back-end ZLR benefit of each said command in said hard disk drive command queue within said working partition.

8. A method for implementing command queue ordering with prefetch benefit determination as recited in claim 7 includes the steps of comparing said calculated ZLR benefit and said calculated back-end ZLR benefit of each said command in said hard disk drive command queue within said working partition and setting a seek starting point and said prefetch benefit responsive to said compared values.

9. A method for implementing command queue ordering with prefetch benefit determination as recited in claim 8 wherein the steps of comparing said calculated ZLR benefit and said calculated back-end ZLR benefit of each said command in said hard disk drive command queue within said working partition enables comparing a benefit of starting a prefetch with a next command seek or continuing to prefetch data for a currently executing command.

10. A computer program product for hard disk drive command queue ordering in a disk drive including a processor unit, said computer program product including a plurality of computer executable instructions stored on a computer readable medium, wherein said instructions, when executed by said processor unit, cause the processor unit to perform the steps of:

calculating a rotational position optimization (RPO) score for each command in a hard disk drive command queue;

calculating a prefetch benefit of each said command in said hard disk drive command queue within a working partition including the steps of multiplying a cache hit probability resulting from a prefetch by an average time required to execute a non-cached command to calculate said prefetch benefit, calculating said cache hit probability resulting from said prefetch;

wherein the step of calculating said cache hit probability resulting from said prefetch is represented by:

$$P(\text{cache hit}) = (\text{net cache addition})/(\text{net partition size})$$

where said net cache addition equals a net amount of valid data to be added to a cache as part of read and prefetch operations and said net partition size is a calculated variable, modifying said RPO score of said identified commands in said hard disk drive command queue within said working partition utilizing said calculated prefetch benefit; and identifying a best RPO score for selecting a next command in said hard disk drive command queue to execute.

11. Apparatus for implementing command queue ordering with prefetch benefit determination comprising:

a processor;

said processor for receiving a command from a host;

said processor for calculating a rotational position optimization (RPO) score for each command in a hard disk drive command queue;

said processor for calculating a prefetch benefit of each said command in said hard disk drive command queue within a working partition including the steps of multiplying a cache hit probability resulting from a prefetch by an average time required to execute a non-cached command to calculate said prefetch benefit, calculating said cache hit probability resulting from said prefetch;

wherein the step of calculating said cache hit probability resulting from said prefetch is represented by:

$$P(\text{cache hit}) = (\text{net cache addition})/(\text{net partition size})$$

where said net cache addition equals a net amount of valid data to be added to a cache as part of read and prefetch operations and said net partition size is a calculated variable, said processor for modifying said RPO score of said identified commands in said hard disk drive command queue within said working partition utilizing said calculated prefetch benefit; and said processor for identifying a best RPO score for selecting a next command in said hard disk drive command queue to execute.

12. Apparatus for implementing command queue ordering with prefetch benefit determination as recited in claim 11 wherein said processor for calculating said prefetch benefit of each said command in said hard disk drive command queue within said working partition includes said processor for calculating a zero latency read (ZLR) benefit of each said command in said hard disk drive command queue within said working partition and a back-end ZLR benefit of each said command in said hard disk drive command queue within said working partition for comparing a benefit of starting a prefetch with a next command seek or continuing to prefetch data for a currently executing command.

* * * * *